(12) United States Patent
Vangala et al.

(10) Patent No.: US 12,273,201 B2
(45) Date of Patent: Apr. 8, 2025

(54) RADIO LINK CONTROL CUMULATIVE MODE FOR NEW RADIO

(71) Applicant: Apple Inc., Cupertino, CA (US)

(72) Inventors: Sarma V. Vangala, Campbell, CA (US); Alexander Sirotkin, Hod Hasharon (IL); Dawei Zhang, Saratoga, CA (US); Fangli Xu, Beijing (CN); Haijing Hu, Los Gatos, CA (US); Naveen Kumar R. Palle Venkata, San Diego, CA (US); Pavan Nuggehalli, San Carlos, CA (US); Ralf Rossbach, Munich (DE); Sethuraman Gurumoorthy, San Ramon, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/904,547

(22) PCT Filed: Sep. 2, 2021

(86) PCT No.: PCT/CN2021/116247
§ 371 (c)(1),
(2) Date: Aug. 18, 2022

(87) PCT Pub. No.: WO2023/028950
PCT Pub. Date: Mar. 9, 2023

(65) Prior Publication Data
US 2024/0195531 A1 Jun. 13, 2024

(51) Int. Cl.
*H04L 1/1607* (2023.01)
*H04L 47/32* (2022.01)

(52) U.S. Cl.
CPC .......... *H04L 1/1635* (2013.01); *H04L 47/323* (2013.01)

(58) Field of Classification Search
CPC ..... H04L 1/1635; H04L 47/323; H04L 47/34; H04L 47/32; H04L 1/1835; H04L 1/16;
(Continued)

(56) References Cited

U.S. PATENT DOCUMENTS 5,961,605 A * 10/1999 Deng .................... H04L 47/431
709/237
6,424,626 B1 * 7/2002 Kidambi ............... H04L 69/168
370/410
(Continued)

FOREIGN PATENT DOCUMENTS

CN 103001751 3/2013

*Primary Examiner* — Mohamed A Kamara
(74) *Attorney, Agent, or Firm* — Fay Kaplun & Marcin, LLP

(57) ABSTRACT

A user equipment (UE) configured to receive a first cumulative acknowledgement (ACK) from a protocol stack of the UE at a first time, store the first cumulative ACK in a queue, receive a second cumulative ACK from the protocol stack at a second time, wherein the second time occurs after the first time, store the second cumulative ACK in the queue, discard the first cumulative ACK from the queue based on the second cumulative ACK being received after the first cumulative ACK and encapsulate the second cumulative ACK to form a radio link control (RLC) packet data unit (PDU) that is to be transmitted over the air.

20 Claims, 8 Drawing Sheets

(58) Field of Classification Search
CPC ....... H04L 1/1621; H04L 1/1829; H04L 1/18; H04L 1/1848; H04L 2212/00; H04W 28/02

See application file for complete search history.

(56) References Cited

U.S. PATENT DOCUMENTS

| | | |
|---|---|---|
| 11,950,238 B2* | 4/2024 | Elshafie ................ H04L 5/0055 |
| 2008/0095099 A1 | 4/2008 | Kesselman et al. |
| 2010/0110985 A1 | 5/2010 | Umesh et al. |
| 2015/0023167 A1 | 1/2015 | Tong |
| 2016/0073449 A1 | 3/2016 | Pang et al. |
| 2016/0302197 A1 | 10/2016 | Xie |
| 2017/0063498 A1 | 3/2017 | Venkatsuresh et al. |
| 2018/0132306 A1 | 5/2018 | Pang et al. |
| 2018/0213439 A1 | 7/2018 | Uchino et al. |
| 2019/0045388 A1 | 2/2019 | Zhang et al. |
| 2020/0204303 A1 | 6/2020 | Meyer et al. |
| 2020/0266955 A1 | 8/2020 | Agrawal et al. |
| 2021/0058200 A1* | 2/2021 | Ohta ..................... H04L 69/163 |
| 2024/0007899 A1 | 1/2024 | Eskelinen |

* cited by examiner

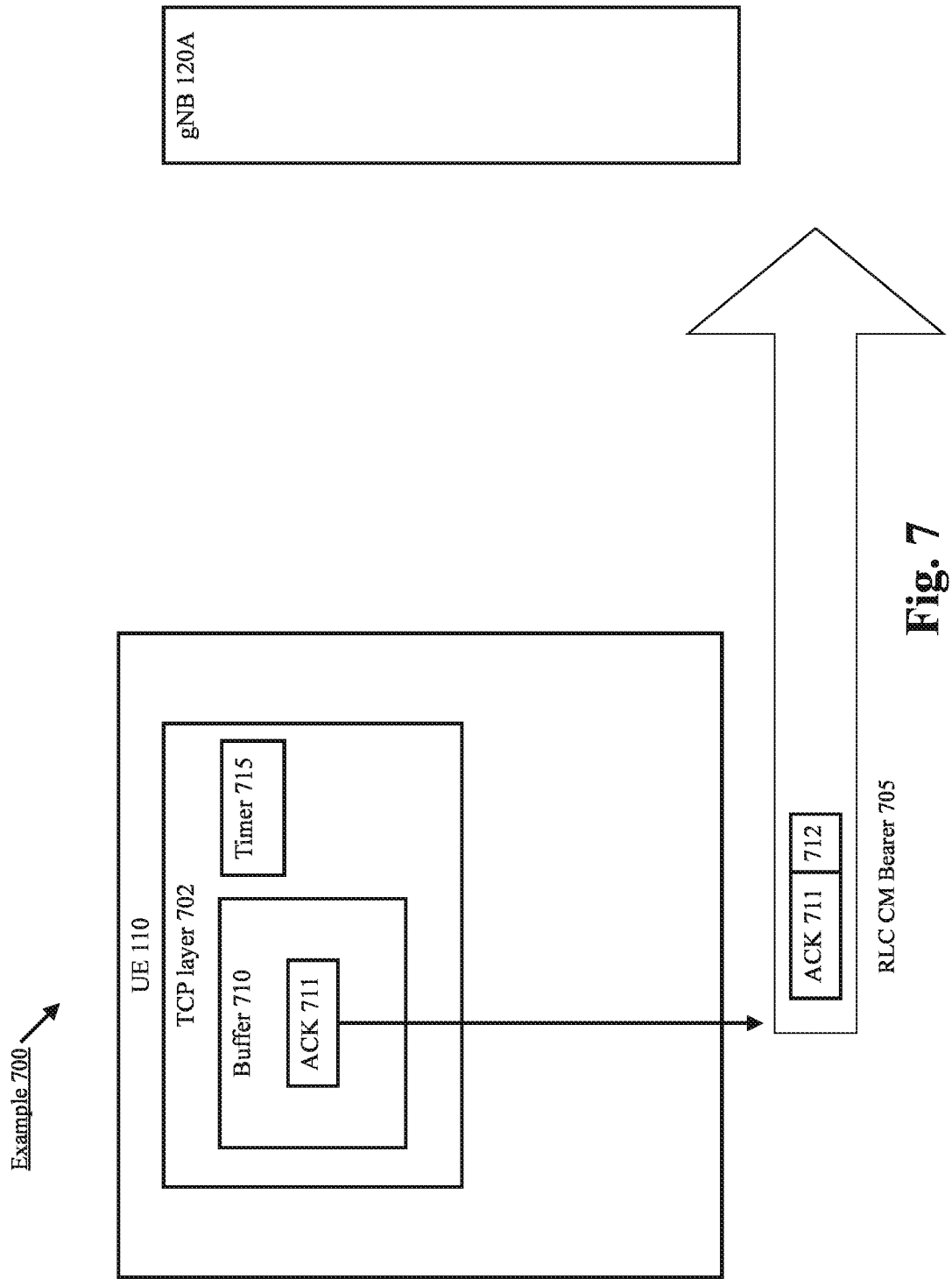

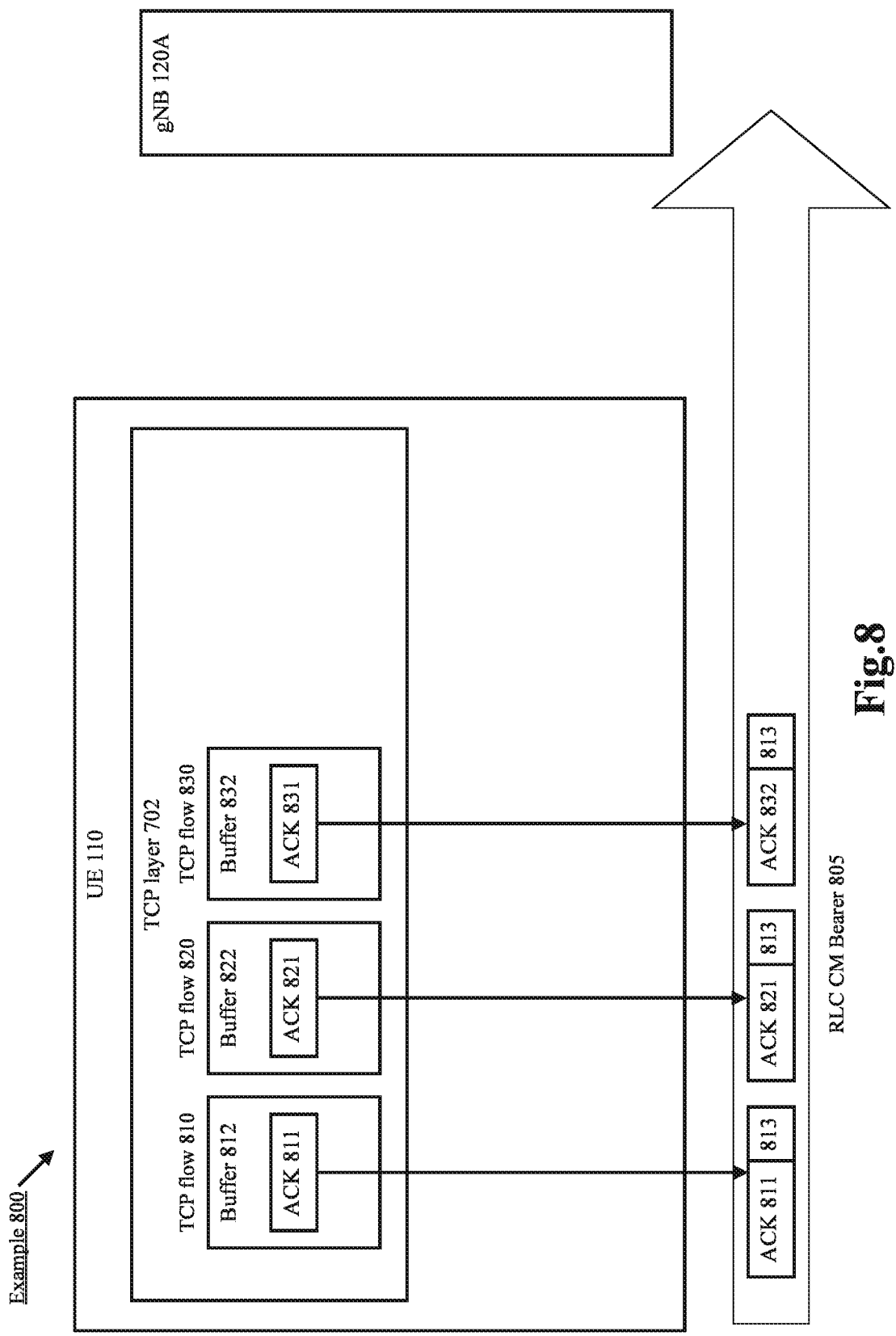

RADIO LINK CONTROL CUMULATIVE MODE FOR NEW RADIO

TECHNICAL FIELD

This application relates generally to wireless communication, and in particular relates to Radio Link Control Cumulative Mode for New Radio.

BACKGROUND

Cumulative acknowledgement (ACK) generally refers to a type of automatic repeat request (ARQ) feedback in which the most recently generated ACK indicates the reception of all the data up until the sequence number indicated by the ACK. Various types of applications such as, but not limited to, transmission control protocol (TCP) applications may be configured with cumulative ACKs. It has been identified that it may be beneficial for fifth generation (5G) new radio (NR) to implement a radio control link (RLC) operating mode that is configured for cumulative ACK feedback.

SUMMARY

Some exemplary embodiments are related to a processor of a user equipment (UE) configured to perform operations. The operations include receiving a first cumulative acknowledgement (ACK) from a protocol stack of the UE at a first time, storing the first cumulative ACK in a queue, receiving a second cumulative ACK from the protocol stack at a second time, wherein the second time occurs after the first time, storing the second cumulative ACK in the queue, discarding the first cumulative ACK from the queue based on the second cumulative ACK being received after the first cumulative ACK and encapsulating the second cumulative ACK to form a radio link control (RLC) packet data unit (PDU) that is to be transmitted over the air.

Other exemplary embodiments are related to a user equipment (UE) having a transceiver configured to communicate with a network and a processor communicatively coupled to the transceiver and configured to perform operations. The operations include receiving a first cumulative acknowledgement (ACK) from a protocol stack of the UE at a first time, storing the first cumulative ACK in a queue, receiving a second cumulative ACK from the protocol stack at a second time, wherein the second time occurs after the first time, storing the second cumulative ACK in the queue, discarding the first cumulative ACK from the queue based on the second cumulative ACK being received after the first cumulative ACK and encapsulating the second cumulative ACK to form a radio link control (RLC) packet data unit (PDU) that is to be transmitted over the air.

Still further exemplary embodiments are related to a processor of a user equipment (UE) configured to perform operations. The operations include identifying a first transmission control protocol (TCP) acknowledgement (ACK) at a TCP layer of the UE, storing the first TCP ACK in a buffer, wherein a timer is initiated in response to the storing, identifying a second TCP ACK from the TCP stack at a second time, wherein the second time occurs after the first time and prior to the expiration of the timer, discarding the first TCP ACK from the buffer based on when the second TCP ACK was identified and encapsulating the second TCP ACK to form a radio link control (RLC) packet data unit (PDU) that is to be transmitted over the air.

Additional exemplary embodiments are related to a user equipment (UE) having a transceiver configured to communicate with a network and a processor communicatively coupled to the transceiver and configured to perform operations. The operations include identifying a first transmission control protocol (TCP) acknowledgement (ACK) at a TCP layer of the UE, storing the first TCP ACK in a buffer, wherein a timer is initiated in response to the storing, identifying a second TCP ACK from the TCP stack at a second time, wherein the second time occurs after the first time and prior to the expiration of the timer, discarding the first TCP ACK from the buffer based on when the second TCP ACK was identified and encapsulating the second TCP ACK to form a radio link control (RLC) packet data unit (PDU) that is to be transmitted over the air.

BRIEF DESCRIPTION OF THE DRAWINGS

FIG. 7 shows an example of RLC CM operation with a single TCP flow and TCP flushing according to various exemplary embodiments.

FIG. 8 shows an example of RLC CM operation with multiple TCP flows and TCP flushing according to various exemplary embodiments.

DETAILED DESCRIPTION

Figure 1:
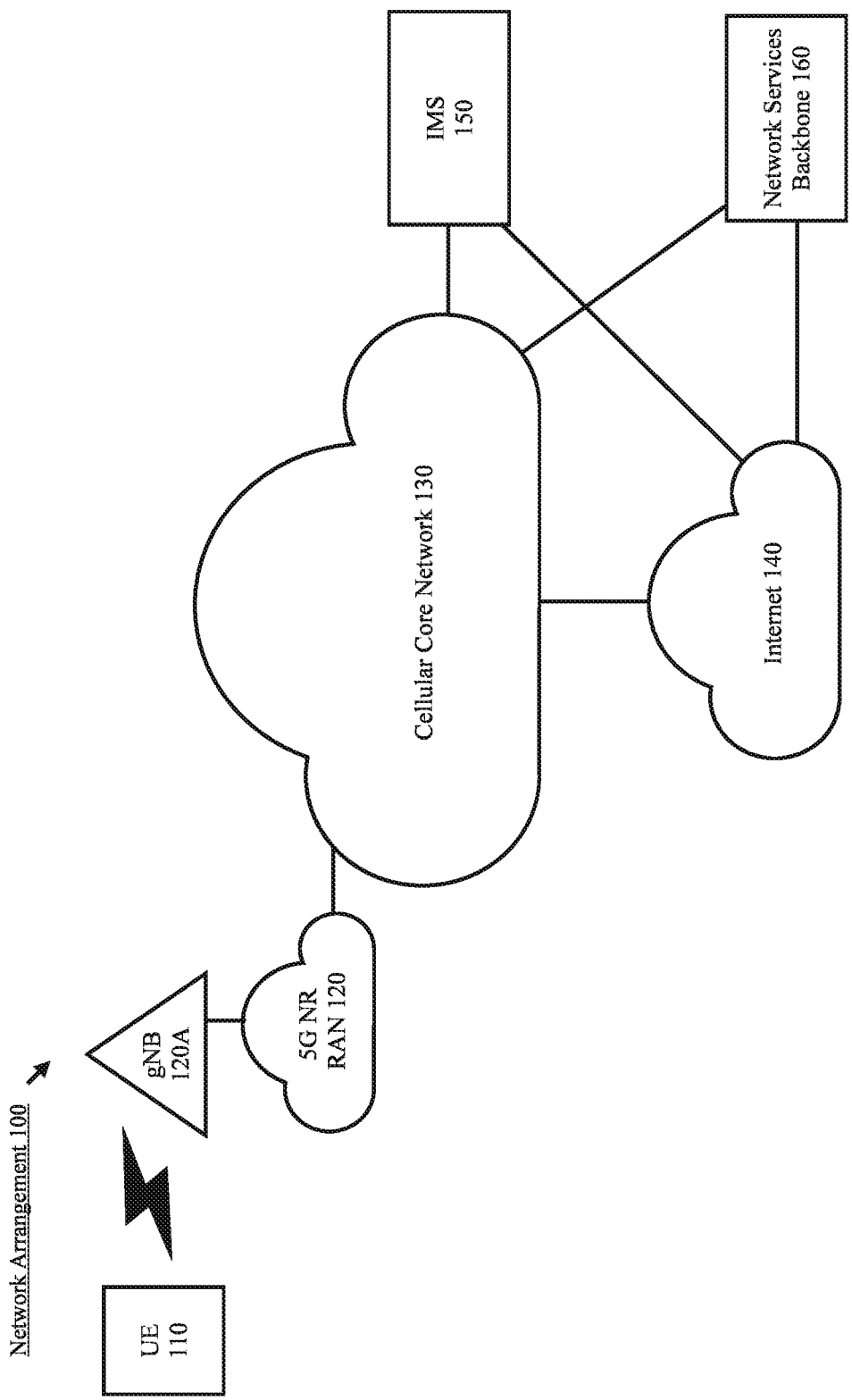
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce a radio link control (RLC) cumulative mode (CM) for fifth generation (5G) new radio (NR). As will be described in more detail below, RLC CM is configured for cumulative acknowledgement (ACK) feedback. The term "cumulative ACK" generally refers to a type of automatic repeat request (ARQ) feedback in which a most recently generated ACK indicates the successful reception of all the data up until the sequence number indicated by the ACK. When cumulative ACK feedback is utilized, it may not be necessary for every ACK to be transferred successfully for the corresponding communication protocol to adequately function. RLC CM leverages this aspect of cumulative ACK feedback to provide performance benefits at the RLC transmitting and RLC receiving nodes.

Those skilled in the art will understand that RLC refers to a layer 2 radio link protocol that may be used for over the air communication. For example, a user equipment (UE) may generate ARQ feedback (e.g., ACKs, NACKs, etc.) and then encapsulate the ARQ feedback as an RLC packet data unit (PDU) for transmission over the air. However, any reference to a UE generating ARQ feedback is merely provided for illustrative purposes. The exemplary embodiments may be utilized by any appropriate type of device configured to transmit ARQ feedback encapsulated as an RLC PDU over the air to another node.

3GPP RLC protocols may be used by various different types of applications to transmit information and/or data over the air. For example, as indicated above, an ACK generated in accordance with a first communication protocol may be transmitted over the air using a second different communication protocol, e.g., RLC. In some scenarios, the first communication protocol may not require every ACK to be received for the communication protocol to function because the first communication protocol may utilize cumulative ACK feedback. However, conventional 5G NR 3GPP data path protocols such as RLC acknowledge mode (AM), RLC unacknowledged mode (UM), RLC transparent mode (TM) do not take advantage of this type of feedback.

Transmission control protocol is one example of a communication protocol that may be configured with cumulative ACK feedback. Those skilled in the art will understand that TCP applications typically use RLC AM. Prior to describing the exemplary techniques for RLC CM in detail, a discussion is provided below regarding why it may be beneficial to utilize RLC CM instead of RLC AM for TCP ACKs. However, the exemplary embodiments are not limited to TCP ACKs. Other applications such as, but not limited to, real-time transport control protocol (RTCP), aspects of ultra-reliable low latency (URLLC) and vehicle-to-everything (V2X) may utilize cumulative ACK feedback. The exemplary embodiments may apply to any type of application and/or communication protocol configured with cumulative ACK feedback that may be encapsulated as RLC PDUs. The cumulative ACK feedback may be encapsulated, for example, on a per flow identification (id), a per TCP flow, etc.

TCP refers to one of the transport layer communication protocols encompassed by the Internet protocol suite. As mentioned above, under conventional circumstances, TCP applications typically use RLC AM, which is designed with the aim of transferring every upper layer service data unit (SDU). As a result, in RLC AM, the UE may be configured to transmit every TCP ACK.

Enhanced mobile broadband (eMBB) applications may require high throughput and thus, may generate a relatively large number of TCP ACKs. For instance, TCP ACKs generated in response to a 20 gigabit per second (Gbps) eMBB stream may utilize up to 100 megabits per second (Mbps) of bandwidth. When RLC AM is utilized, each TCP ACK may be encapsulated into various 3GPP headers (e.g., packet data convergence protocol (PDCP), RLC, etc.) and transmitted over the air. If TCP ACKS are lost and/or there is a channel error, the 3GPP lower layers may ensure that the TCP ACKs are retransmitted and even more bandwidth may be consumed. Processing ACKs on this scale may place a strain on power and/or processing resources. Accordingly, utilizing RLC AM for transferring TCP ACKs may have a negative impact on over the air resources, UE processing resources and/or network processing resources.

Although the exemplary embodiments may provide benefits to TCP communication, as mentioned above, the exemplary embodiments are not limited to TCP ACKs. The exemplary embodiments may apply to any cumulative ACK feedback that may be encapsulated as RLC PDUs and transmitted over the air.

The exemplary embodiments introduce RLC CM including various exemplary techniques for generating cumulative ACK feedback and transferring the cumulative ACK feedback via the RLC layer. To provide an example of one exemplary technique, RLC CM may utilize a last in, first out (LIFO) approach where a most recently generated ACK relative to a set of ACKs is transmitted over the air while the other ACKs may be discarded. Each of the exemplary techniques described herein may be used with other currently implemented RLC protocols, future implementations of RLC protocols or independently from other RLC protocols. In addition, reference to the term RLC CM is merely provided for illustrative purposes. Different entities may refer to similar concepts by different names.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IOT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR-RAN 120. Therefore, the UE 110 may have a 5G NR chipset to communicate with the 5G NR-RAN 120.

The 5G NR-RAN 120 may be a portion of a cellular network that may be deployed by a network carrier (e.g., Verizon, AT&T, T-Mobile, etc.). The 5G NR-RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
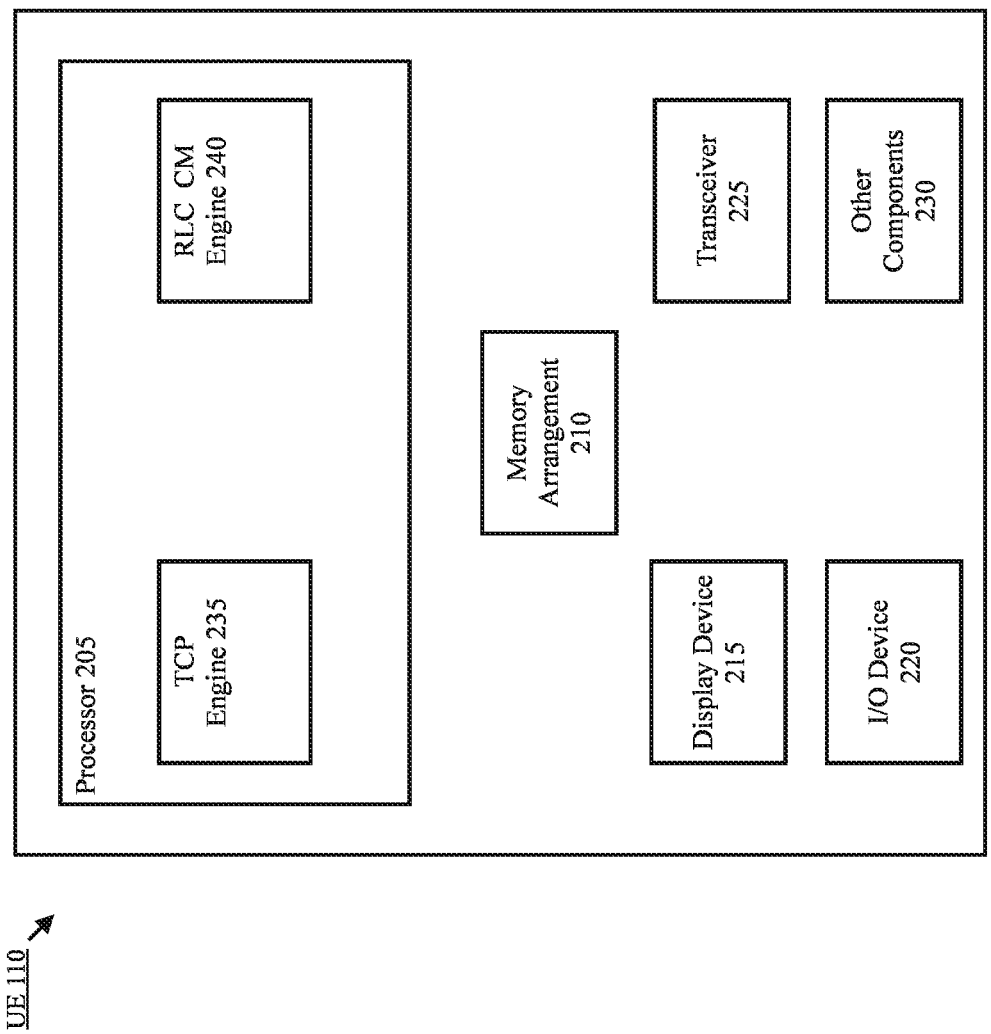
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a TCP engine 235 and an RLC CM engine 240. The TCP engine 235 may perform various operations related to TCP based communication such as, but not limited to, generating TCP ACKs. The RLC CM engine 240 may be configured to perform various operations related to RLC CM such as, but not limited to, establishing a bearer, encapsulating RLC PDUs and managing queues/buffers.

The above referenced engines 235, 240 being an application (e.g., a program) executed by the processor 205 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
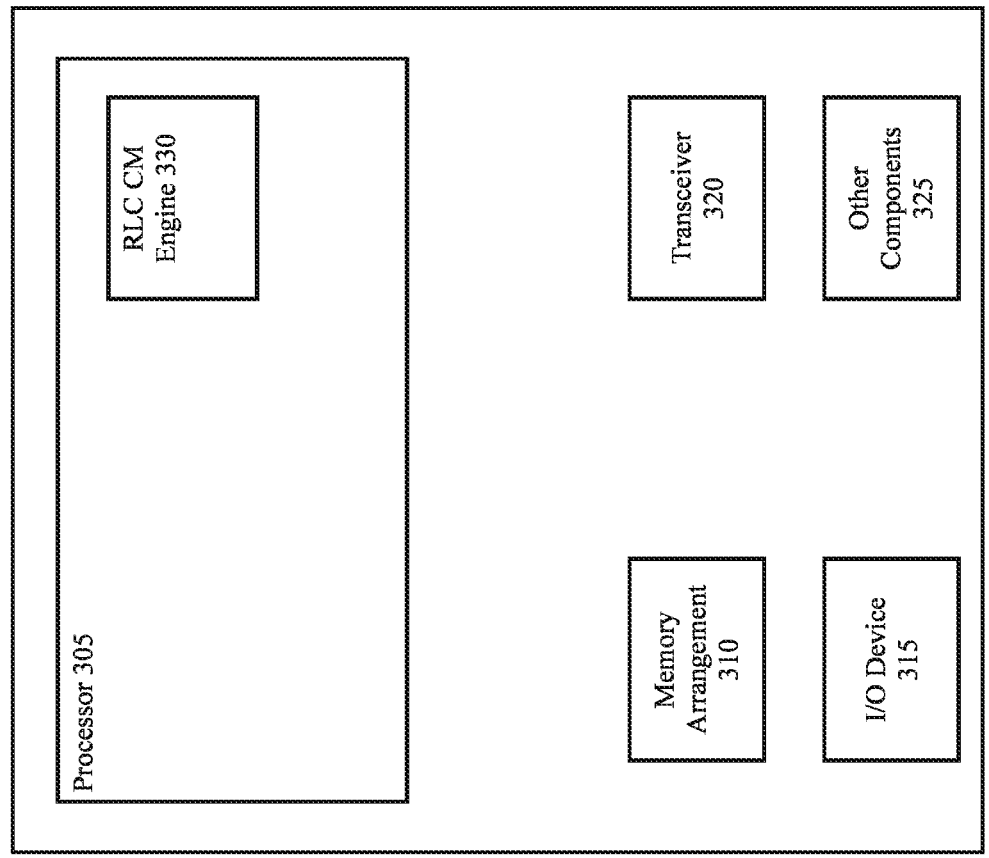
FIG. 3 shows an exemplary base station according to various exemplary embodiments.

FIG. 3 shows an exemplary base station 300 according to various exemplary embodiments. The base station 300 may represent the gNB 120A or any other type of access node through which the UE 110 may establish a connection and manage network operations. The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 105. For example, the engines may include an RLC CM engine 330. The RLC CM engine 330 may perform various operations related to RLC CM such as, but not limited to, establishing a bearer, identifying ACKs encapsulated as RLC PDUs, discarding RLC PDUs and providing the ACKs further downstream (e.g., the Internet 140, etc.).

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory arrangement 310 may be a hardware component configured to store data related to operations performed by the base station 300. The I/O device 315 may be a hardware component or ports that enable a user to interact with the base station 105. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Various exemplary techniques for RLC CM are described with regard to a signaling exchange in which the gNB 120A transmits multiple packets to the UE 110. In response, ARQ feedback is generated by the UE 110 (e.g., TCP engine 235) comprising one or more cumulative ACKs. One of the ACKs may then be encapsulated as an RLC PDU and transmitted over the air to the gNB 120A. However, any reference to the cumulative ACK feedback being generated by the UE 110 is merely provided for illustrative purposes. RLC CM may be utilized for downlink communication and/or uplink communication.

In addition, various examples are described with regard to TCP. However, the exemplary embodiments are not limited to TCP or TCP ACKs and may apply to any appropriate type of cumulative ACK feedback. The following description provides a general overview of TCP communication within the context of the network arrangement 100 of FIG. 1. After this general overview, specific examples of various exemplary techniques are provided.

Initially, consider a scenario in which a TCP client is running on the UE 110 and connected to a remote server hosted on the Internet 140. The connection between the client and the remote server may be facilitated by the 5G NR network (e.g., gNB 120A, 5G NR-RAN 120, core network 130, etc.). The TCP client may be configured to use RLC CM and thus, a bearer may be established between the UE 110 and the qNB 120A that is configured to transfer TCP ACKs encapsulated as RLC PDUs from the UE 110 to the gNB 120A.

The gNB 120A may receive TCP packets intended for the UE 110 from the remote server hosted on the Internet 140. The TCP packets may then be encapsulated by, at least, an RLC header to generate one or more RLC PDUs that are to be transmitted over the air to the UE 110. How the TCP packets travel from the remote server to the gNB 120A and the manner in which they are processed for transmission over the air is beyond the scope of the exemplary embodiments. Instead, the exemplary embodiments relate to generating and transmitting ACKs.

At the UE 110, the RLC PDUs are processed and the TCP data encapsulated by the RLC PDUs is provided to the TCP client. In this example, it is assumed that the TCP data encapsulated by the RLC PDUs was successfully received. In response, the UE 110 may generate a set of TCP ACKs. In some embodiments, only one TCP ACK from the set of TCP ACKs may be provided to the RLC layer while the other TCP ACKs are discarded before the RLC layer. In other embodiments, the set of TCP ACKs may be provided to the RLC layer. However, only the most recently generated TCP ACK from the set of TCP ACKs may be encapsulated as an RLC PDU and the other TCP ACKs from the set of TCP ACKs may be discarded at the RLC layer.

Figure 4:
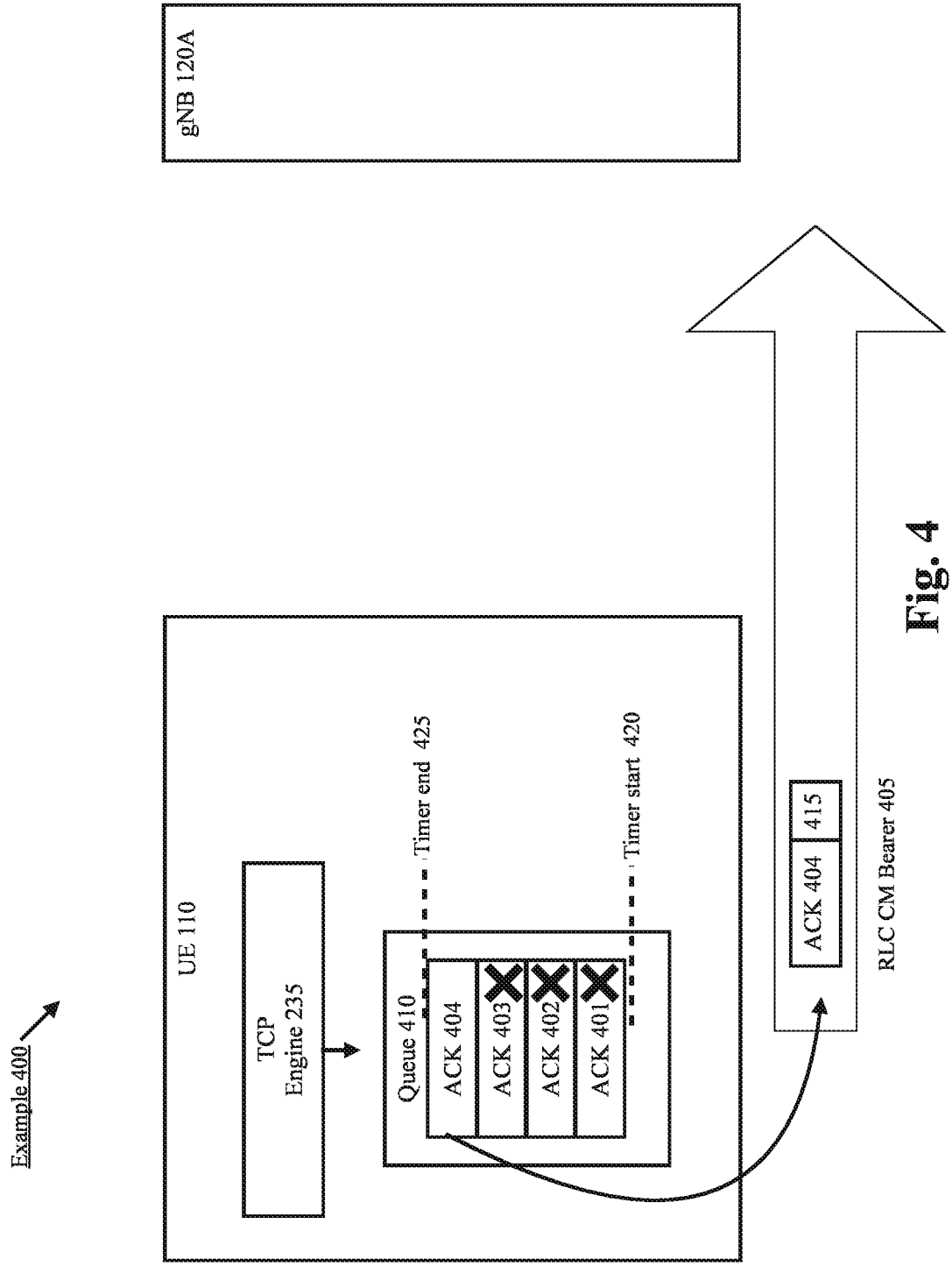
FIG. 4 shows an example of radio link control (RLC) cumulative mode (CM) operation according to various exemplary embodiments.

FIG. 4 shows an example 400 of RLC CM operation according to various exemplary embodiments. Example 400 is described with regard to a single TCP flow. Specific examples regarding RLC CM and multiple TCP flows are provided below with regard to FIGS. 6-8.

The example 400 shows a RLC CM bearer 405 configured as a dedicated radio bearer for the transfer of cumulative ACKs encapsulated as RLC PDUs from the UE 110 to gNB 120A (or any other appropriate RLC node). The RLC CM bearer 405 may be configured by the network at the RAN layer using one or more radio resource control (RRC) messages. The RLC CM bearer also provides a mechanism to have separate treatment of this dedicated radio bearer/logical channel and the medium access control (MAC) layer.

The TCP engine 235 generates four cumulative ACKs 401-404 which are then placed in the queue 410. RLC CM may utilize a LIFO approach where a most recently generated cumulative ACK is transmitted and other cumulative ACKs are discarded. To provide an example, the UE 110 (e.g., RLC CM engine 240) may execute a timer. When the timer expires, the UE 110 may be triggered to transmit the most recently generated ACK stored in the queue 410 (e.g., ACK 404) over the RLC CM bearer 405 and discard the other cumulative ACKs stored in the queue 410 (e.g., ACKs 401-403). The operation of this timer is illustrated in the example 400 by the dotted lines timer start 420 and timer end 425. This example serves as a general overview of how RLC CM may be configured to manage TCP ACKs generated by the TCP engine 235. Specific examples of managing TCP ACKs using modem flushing are provided below with regard to FIGS. 5 and 6 and specific examples of managing TCP ACKS using TCP flushing are provided below with regard to FIGS. 7 and 8.

In some embodiments, the cumulative ACKs generated by the TCP engine 235 may be tagged with metadata. The metadata may identify a particular flow ID, indicate that the cumulative ACK is not to be discarded or include any other appropriate type of information.

As indicated above, in example 400, ACK 404 is selected for transmission on the RLC CM bearer 405. Prior to being transmitted over the air, the ACK 404 may be configured with one or more headers 415, e.g., a service data adaptation protocol (SDAP) header, a packet data convergence protocol (PDCP) header, an RLC header, etc. Once encapsulated as an RLC PDU, the ACK 404 and the one or more headers 415 are transmitted over the RLC CM bearer 405.

In some embodiments, the UE 110 may switch between RLC CM and RLC AM. For example, the UE 110 may determine whether to utilize RLC CM or RLC AM based on reliability of TCP ACK delivery. For example, if there is multiple HARQ failures or new TCP ACKs are not available within a timeout window, the UE 110 may request that RLC CM is switched to RLC AM until there is a sufficient reliability of TCP ACK delivery.

At the gNB 120A, the ACK 404 and the headers 415 are received over the RLC CM bearer 405 as an RLC PDU. The gNB 120A may process the headers 415, identify the cumulative ACK 404 and send it up the protocol stack. In some embodiments, lossless transfer of cumulative ACKs is enabled and ARQ is not performed on older ACKs.

In some embodiments, a timer may be implemented at the qNB 120A. This timer may be referred to as a "wait timer" and be utilized for processing incoming TCP ACKs. For example, of a new TCP ACK is received prior to the expiration of the wait timer, the older TCP ACK in the queue may be dropped and the newly arrived TCP ACK may be sent up the protocol stack. If no new TCP ACK arrived prior to the expiration of the timer, an indication may be provided to the UE 110 as an RLC PDU status report. In response, the UE 110 may ensure that the TCP ACK carrying the most cumulative information is reliably delivered to the gNB 120A. As indicated above, the UE 110 may switch from RLC CM to RLC AM when reliability of TCP ACK delivery is needed.

Figure 5:
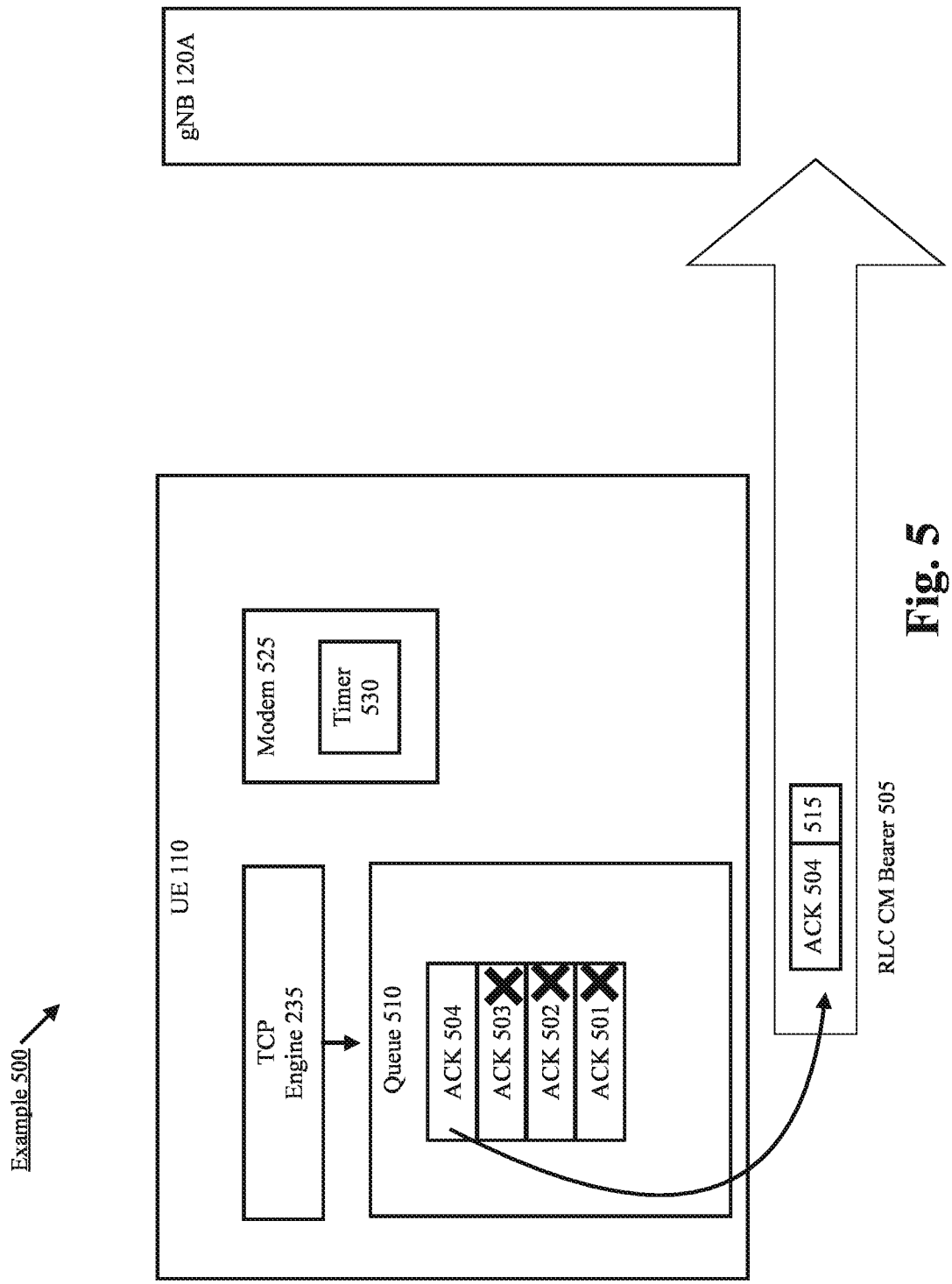
FIG. 5 shows an example of RLC CM operation with a single transmission control protocol (TCP) flow and modem flushing according to various exemplary embodiments.

FIG. 5 shows an example 500 of RLC CM operation with a single TCP flow and modem flushing according to various exemplary embodiments. The example 500 is described from the perspective of a UE 110 configured with the RLC CM bearer 505.

In example 500, the TCP engine 235 generates cumulative ACKs 501-504. The ACKs 501-504 are pushed into an active queue management (AQM) queue 510 located between an application processor (not picture) and a modem 525 (e.g., baseband processor).

The modem 525 may operate a timer 530 associated with the queue 510. When the timer 530 expires, the modem 525 discards the TCP ACKs in the queue 510 except for the TCP ACK most recently pushed to the queue 510 by the TCP engine 235. In this example, the modem 525 discards ACKs 501-503 and retains ACK 504 based on when each of the ACKs 501-504 were received at the queue 510. The modem 525 then frames the packet by adding one or more headers 515 (e.g., SDAP, PDCP, RLC, etc.) and sends the encapsulated RLC PDU out over the RLC CM bearer 505.

Figure 6:
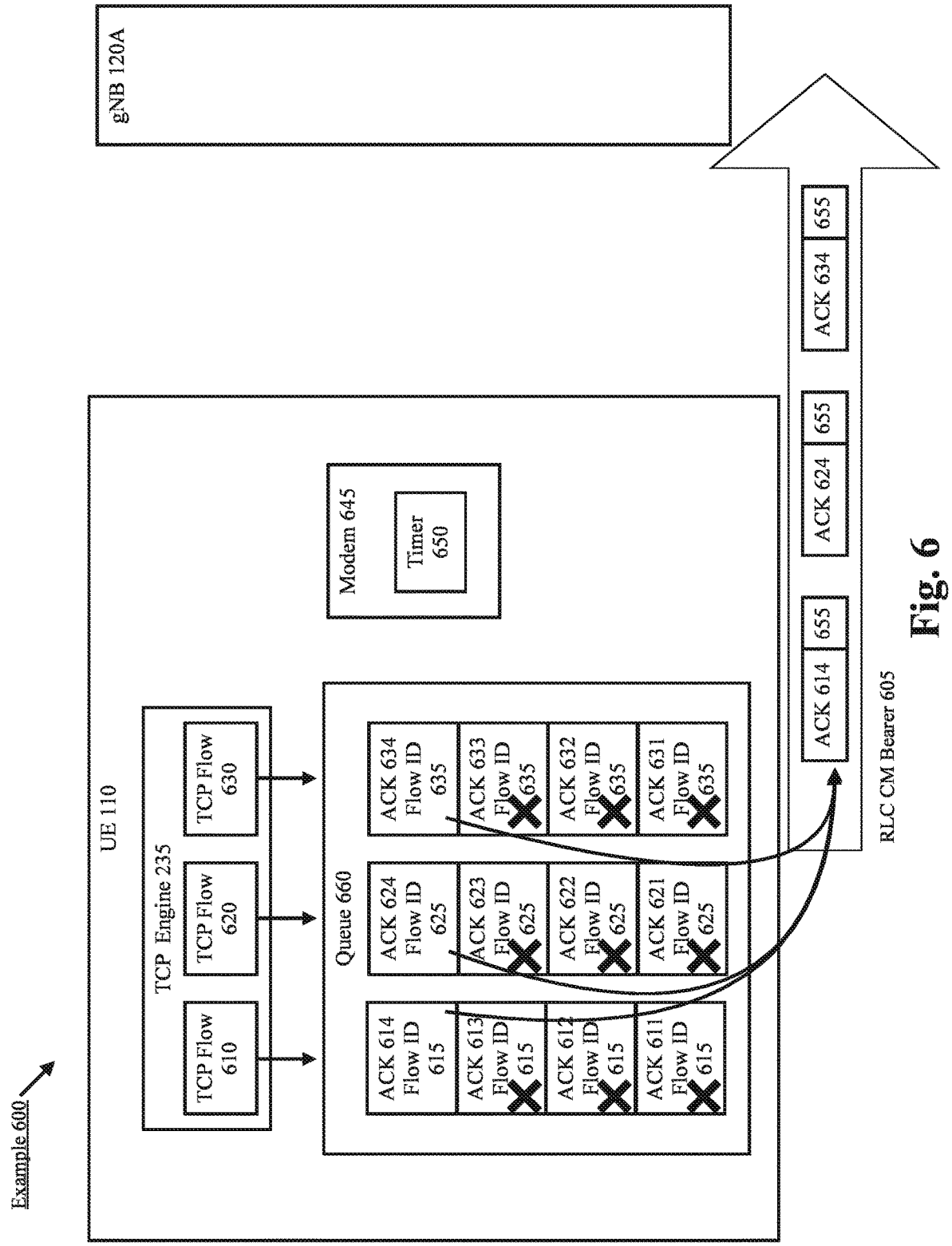
FIG. 6 shows an example of RLC CM operation with multiple TCP flows and modem flushing according to various exemplary embodiments.

FIG. 6 shows an example 600 of RLC CM operation with multiple TCP flows and modem flushing according to various exemplary embodiments. The example 600 is described from the perspective of a UE 110 configured with the RLC CM bearer 605.

In example 600, the TCP engine 235 is configured with three different TCP flows 610-630. For modem flushing, the ACKs may be tagged with metadata from the TCP stack indicating a flow ID. The flow ID allows the lower layers to distinguish ACKs from different TCP flows. In this example, the TCP engine 235 generates ACKs 611-614 for TCP flow 610 and tags each of the ACKs 611-614 with a first flow ID 615. The TCP engine 235 generates ACKs 621-624 for TCP flow 620 and tags each of the ACKs 621-624 with a second different flow ID 625. The TCP engine 235 generates ACKs 631-634 for TCP flow 630 and tags each of the ACKs 631-634 with a third different flow ID 635.

The ACKs 611-614, 621-624, 631-634 are pushed into an AQM queue 660 located between an application processor (not pictured) and a modem 645 (e.g., baseband processor). The modem 645 may operate a timer 650 associated with the queue 660. When the timer 650 expires, the modem 645 discards the TCP ACKs in the queue 660 except for the most recent TCP ACK of each TCP flow 610-630. Thus, in this example, TCP ACKs 614, 624 and 634 are retained while the other ACKs are flushed by the modem 645. Subsequently, the modem 645 may encapsulate each of the TCP ACKS 614, 624 and 634 with one or more headers 655 (e.g., SDAP, PDCP, RLC, etc.) and transmit the encapsulated RLC PDUs over the RLC CM bearer 605.

FIG. 7 shows an example 700 of RLC CM operation with a single TCP flow and TCP flushing according to various exemplary embodiments. The example 700 is described from the perspective of a UE 110 configured with the RLC CM bearer 705.

In the example 700, the UE 110 may be configured to identify TCP ACKs at the TCP layer 702 of the UE 110. When a TCP ACK is identified it is placed in the buffer 710 and a timer 715 is initiated. The duration of the timer 715 may be based on a downlink data rate. If a new TCP ACK is received by the buffer 710 before the timer expires, the new TCP ACK replaces the previously received TCP ACK. Since the buffer is configured for a single TCP ACK, the example 700 shows a single TCP ACK 711.

When the timer 715 expires, the TCP ACK in the buffer 710 is encapsulated by one or more headers 712 (e.g., SDAP, PDCP, RLC, etc.) and the UE 110 transmits the encapsulated RLC PDU over the RLC CM bearer 705. At the gNB 120A, upon reception and successful unframing, the TCP stack may use the cumulative ACK and/or TCP selective acknowledgement (SACK) information appended to the TCP ACK 711 to determine whether TCP sequence numbers up until the sequence number of TCP ACK 711 have been acknowledged by the UE 110.

In some scenarios, there may be multiple TCP flows with each flow generating its own ACKs. In this example, the buffer 710 may store one TCP ACK per flow. If a new TCP ACK is received before the timer 715 expires, the new TCP ACK replaces the TCP ACK stored in the buffer that is associated with the same TCP flow. When the timer 715 expires, a cumulative ACK for each TCP flow may be encapsulated with the one or more headers 712 and transmitted over the RLC CM bearer 705.

FIG. 8 shows an example 800 of RLC CM operation with multiple TCP flows and TCP flushing according to various exemplary embodiments. The example 800 is described from the perspective of a UE 110 configured with the RLC CM bearer 805. As will be shown below, the example 800 differs from the multiple flow example described above with regard to example 700 in that each TCP flow is configured with its own TCP buffer.

In example 800, the TCP layer 802 is configured with three different TCP flows 810-830. Each TCP flow 810-830 is configured with a buffer 812, 822, 832. When a TCP ACK is identified at the TCP layer 802 it is placed in the buffer associated with its corresponding TCP flow and a timer is initiated. If a new TCP ACK is received by a buffer before the timer expires, the new TCP ACK replaces the previously received TCP ACK. Since each buffer is configured for a single TCP ACK, the example 800 shows a single TCP ACK 811 in buffer 812, a single TCP ACK 821 in buffer 822 and a single TCP ACK 831 in buffer 832. When the timer expires, the cumulative ACKs are encapsulated with the one or more headers 813 and transmitted over the RLC CM bearer 805.

To eliminate the need for header processing at the device that receives the TCP ACKs, the content of the TCP ACKs may be copied over on to another header. In one option, a MAC control element (CE) may be configured to carry intermittent TCP overhead information such as, but not limited to, a scheduling request (SR)/buffer status report (BSR) timer configured for high throughput scenarios. In a second option, the contents of the TCP ACKs may be copied onto the RLC header. In this approach, the RLC header size may be extended to accommodate this feature. In a third option, RLC and PDCP stats PDU IEs may be used to inform the UE 110 if the highest TCP sequence number received using the meta data provided in the TCP ACK. This may ensure that packet de-framing does not need to be done at the received.

In some embodiments, if downlink gains are also needed for uplink data transfers, then the network can define this RLC CM as a new 5G quality of service (Qos) identifier (5QI). The 5QI may have throughputs in accordance with the TCP ACK generation with packet drop rates defined to include the LIFO approach of RLC CM and latency bounds matching RLC and/or PDCP latencies.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving a first cumulative acknowledgement (ACK) from a protocol stack of the UE at a first time;
   storing the first cumulative ACK in a queue;

receiving a second cumulative ACK from the protocol stack at a second time, wherein the second time occurs after the first time;

storing the second cumulative ACK in the queue;

discarding the first cumulative ACK from the queue based on the second cumulative ACK being received after the first cumulative ACK; and encapsulating the second cumulative ACK to form a radio link control (RLC) packet data unit (PDU) that is to be transmitted over the air.

2. The processor of claim 1, wherein the first cumulative ACK and the second cumulative ACK correspond to a single transmission control protocol (TCP) flow.

3. The processor of claim 2, the operations further comprising:

receiving a set of cumulative ACKs corresponding to a second different TCP flow, each cumulative ACK corresponding to the second different TCP flow is tagged with a same flow ID.

4. The processor of claim 3, wherein within a timer duration only one cumulative ACK is encapsulated per flow ID.

5. The processor of claim 1, wherein the protocol stack is a transmission control protocol (TCP) protocol stack and the processor is a modem.

6. The processor of claim 1, the operations further comprising:

initiating a timer, wherein expiration of the timer is configured to trigger the discarding.

7. The processor of claim 1, wherein contents of the second cumulative ACK are copied on a RLC header.

8. A user equipment (UE), comprising:

a transceiver configured to communicate with a network; and a processor communicatively coupled to the transceiver and configured to perform operations comprising:

receiving a first cumulative acknowledgement (ACK) from a protocol stack of the UE at a first time;

storing the first cumulative ACK in a queue;

receiving a second cumulative ACK from the protocol stack at a second time, wherein the second time occurs after the first time;

storing the second cumulative ACK in the queue;

discarding the first cumulative ACK from the queue based on the second cumulative ACK being received after the first cumulative ACK; and encapsulating the second cumulative ACK to form a radio link control (RLC) packet data unit (PDU) that is to be transmitted over the air.

9. The UE of claim 8, wherein the first cumulative ACK and the second cumulative ACK correspond to a single transmission control protocol (TCP) flow.

10. The UE of claim 9, the operations further comprising:

receiving a set of cumulative ACKs corresponding to a second different TCP flow, each cumulative ACK corresponding to the second different TCP flow is tagged with a same flow ID.

11. The UE of claim 10, wherein within a timer duration only one cumulative ACK is encapsulated per flow ID.

12. The UE of claim 8, wherein the protocol stack is a transmission control protocol (TCP) protocol stack and the processor is a modem.

13. The UE of claim 8, the operations further comprising:

initiating a timer, wherein expiration of the timer is configured to trigger the discarding.

14. The UE of claim 8, wherein contents of the second cumulative ACK are copied on a RLC header.

15. A processor of a user equipment (UE) configured to perform operations comprising:

identifying a first transmission control protocol (TCP) acknowledgement (ACK) at a TCP layer of the UE;

storing the first TCP ACK in a buffer, wherein a timer is initiated in response to the storing;

identifying a second TCP ACK from the TCP layer at a second time, wherein the second time occurs after a first time and prior to an expiration of the timer;

discarding the first TCP ACK from the buffer based on when the second TCP ACK was identified; and encapsulating the second TCP ACK to form a radio link control (RLC) packet data unit (PDU) that is to be transmitted over the air.

16. The processor of claim 15, wherein a duration of the timer is based on a downlink data rate.

17. The processor of claim 15, wherein the first TCP ACK and the second TCP ACK correspond to a single TCP flow.

18. The processor of claim 17, the operations further comprising:

identifying a third TCP ACK corresponding to a second different TCP flow, wherein each TCP flow is configured with a different buffer at the UE.

19. The processor of claim 17, the operations further comprising:

identifying a third TCP ACK corresponding to a second different TCP flow, wherein each TCP flow is configured with a same buffer at the UE.

20. The processor of claim 15, wherein within a timer duration only one cumulative ACK is encapsulated per TCP flow.

* * * * *